(12) United States Patent
Hu et al.

(10) Patent No.: US 11,540,162 B2
(45) Date of Patent: Dec. 27, 2022

(54) WIRELESS PERCEPTION SYSTEM ENERGY AND INFORMATION TRANSMISSION METHOD OF UNMANNED AERIAL VEHICLE (UAV) SWARM

(71) Applicant: Jilin University, Changchun (CN)

(72) Inventors: Fengye Hu, Changchun (CN); Chi Jin, Changchun (CN); Zhuang Ling, Changchun (CN); Zhi Mao, Changchun (CN); Ruozhou Lv, Changchun (CN); Wuliji Nashun, Changchun (CN); Zhijun Li, Changchun (CN)

(73) Assignee: Jilin University, Changchun (CN)

( * ) Notice: Subject to any disclaimer, the term of this patent is extended or adjusted under 35 U.S.C. 154(b) by 0 days.

(21) Appl. No.: 17/878,944

(22) Filed: Aug. 2, 2022

(65) Prior Publication Data
US 2022/0386162 A1 Dec. 1, 2022

(30) Foreign Application Priority Data
Aug. 30, 2021 (CN) .......................... 202111006293.0

(51) Int. Cl.
| | |
|---|---|
| H04W 4/00 | (2018.01) |
| H04W 28/02 | (2009.01) |
| H04W 4/46 | (2018.01) |
| H04W 72/04 | (2009.01) |
| H02J 50/20 | (2016.01) |
| H04W 74/08 | (2009.01) |
| H04W 84/18 | (2009.01) |

(52) U.S. Cl.
CPC .......... *H04W 28/021* (2013.01); *H02J 50/20* (2016.02); *H04W 4/46* (2018.02); *H04W 72/0446* (2013.01); *H04W 74/0833* (2013.01); *H04W 84/18* (2013.01)

(58) Field of Classification Search
CPC . H04W 28/021; H04W 4/46; H04W 72/0446; H04W 74/0833; H04W 84/18; H02J 50/20
USPC ......................................... 370/329; 455/312
See application file for complete search history.

(56) References Cited

U.S. PATENT DOCUMENTS

2017/0023939 A1\* 1/2017 Krouse ................ G05D 1/0022

\* cited by examiner

*Primary Examiner* — Marcos Batista
(74) *Attorney, Agent, or Firm* — Rumit Ranjit Kanakia (57) ABSTRACT

The present invention discloses a wireless perception system energy and information transmission method of an unmanned aerial vehicle (UAV) swarm, comprising: building a wireless perception system architecture based on multi-UAV energy supply, wherein the system comprises a plurality of wireless powered sensors and a UAV swarm, and each sensor establishes connection with a UAV based on random access to realize network construction; designing energy and information transmission protocols in the swarm and between the swarm and the sensors, designing a joint optimization algorithm and solving optimal system configuration to obtain optimal transmission strategies. The present invention firstly proposes a joint optimization method of multi-network power allocation, time slot design and beam forming under the condition of multi-UAV autonomous collaborative energy supply, and also provides an efficient and reliable communication means for autonomous cooperative control of the UAV swarm.

6 Claims, 2 Drawing Sheets

WIRELESS PERCEPTION SYSTEM ENERGY AND INFORMATION TRANSMISSION METHOD OF UNMANNED AERIAL VEHICLE (UAV) SWARM

TECHNICAL FIELD

The present invention relates to the technical field of autonomous coordination of unmanned aerial vehicle (UAV) swarms, and in particular to a wireless perception system energy and information transmission method of a UAV swarm.

BACKGROUND

In recent years, with the vigorous development of the wireless communication technology, the Internet of Things technology has been rapidly popularized and widely used. At present, intelligent perception networks based on low power sensors have been widely used in various fields such as environmental monitoring, medical care and smart cities. However, in order to satisfy, the miniaturization and lightweight requirements of wireless sensors, the battery capacity is generally limited. The problem of sustainable energy supply becomes a development bottleneck of wireless perception networks, and limits the large-scale deployment. Wireless power transmission (WPT) is regarded as an ideal solution to solve the long-term stable power supply of wireless sensor networks. Compared with the traditional energy acquisition modes of solar energy conversion and mechanical energy conversion, WPT has the characteristic of high controllability in power transmission, signal waveform and time-frequency resource allocation, and has obvious advantages. Based on WPT technology, domestic and foreign scholars have conducted a lot of, related research.

At present, the WPT technology is mainly based on two frames: in 2013, R. Zhang et, al. proposed a simultaneous wireless information and power transfer (SWIPT) method, simultaneously designed a receiver structure based on time switching and power splitting protocols and proved that the SWIPT was feasible in theory and in practice. After 2014, the wireless powered communication, network (WPCN) was also proposed. This technology does not require a complicated receiver structure and has good practicability. So far, based on the above two frames, the relay technology, the multi-antenna technology, the sensor coordination technology and the like have achieved good integration with the WPT technology, making it possible to use wireless powered sensors for perception and data collection.

However, the WPT technology faces serious double near-far effects in practical applications: because the WPT technology uses a radio frequency signal as a carrier for energy transmission, propagation loss becomes more serious with the increase of distance. Therefore, farther sensors often obtain less energy, but need to consume more energy in the process of transmitting perception, data back. The double far-near effects seriously affect the coverage range of the WPT technology, making it inapplicable to large-scale wireless perception systems. An effective method to solve the double near-far effects is to deploy multiple access points (AP). In a multi-AP scenario, the sensor can obtain energy from multiple APs at the same time, and by reasonably designing the transmission power of each AP, the coverage range of each AP can be effectively adjusted, and the energy harvested by each sensor can be balanced, to improve the overall performance of the system.

At present, there is no research in China and abroad to jointly design and improve the coverage range of the wireless perception system in the autonomous collaborative energy supply scenario of a UAV swarm. Considering that the practical use scenario of the wireless powered perception system generally has the characteristic of difficulty in arrival or high danger, an urgent problem to be solved by those skilled in the art is to provide an efficient and reliable wireless perception system energy and information transmission method of a UAV swarm.

SUMMARY

In view of this, the present invention provides a wireless perception system energy and information transmission method of a UAV swarm.

To achieve the above purpose, the present invention adopts the following technical solution:

A wireless perception system energy and information transmission method of a UAV swarm comprises the following steps:

building a wireless perception system architecture based on autonomous and collaborative energy supply of a UAV swarm, wherein the wireless perception system architecture comprises K wireless powered sensors pre-arranged at perception positions and a freely movable UAV swarm, the UAV swarm comprises N UAVs, and each perception subnet comprises a UAV and M sensors managed by the UAV; in the wireless perception system architecture, the UAVs are all provided with A antennas, and the sensors are only provided with a single antenna due to limitations of size and cost;

in the wireless perception system architecture, when perception is required, the UAV swarm arrives at a designated region to perform wireless energy transmission and wireless information transmission on the sensors; each transmission process comprises two stages: a wireless energy harvesting (WEH) stage and a wireless information transmission (WIT) stage;

based on the wireless perception system architecture, establishing a joint optimization model by combining a power allocation weight W, a receiving beam forming weight B and a time division factor $\tau$ in the UAV swarm, and solving optimal system configuration to obtain an optimal transmission strategy; maximizing the total throughput of a sensor uplink under the constraints of data throughput in the UAV swarm;

the joint optimization model is:

$$(P1): \max_{W,B,\tau} \sum_{i=1}^{N} \xi_i C_i(W, B_{ij}, \tau)$$

s.t. $C1: W \pm W^{lb}$
$C2: WW^H = 1,$
$C3: B_{ij}{}^o 1_{1\times A},$
$C4: \tau^{lb} \leq \tau < 1.$ where $\xi_i$ is an importance factor and $\xi_i > 0$; $C_i(W, B_{ij}, \tau)$ is the total throughput in the $i^{th}$ subnet; $B_{ij}$ is a receiving beam forming weight vector; $w_i^{lb}$ is a lower bound of the $i^{th}$ element of a power allocation weight vector W; $W^H$ represents the conjugate transpose of the vector W; and $\tau^{lb}$ is a lower bound of the time division factor $\tau$;

C1, C2 and C3 are constraints; C1 is a data throughput constraint in the UAV swarm; $W^{lb} \in \mathbb{L}^{1\times N}$ is a vector with $w_i^{lb}$ as an element, and represents the lower bound of W; C2 constrains the total power of the wireless energy harvesting (WEH) stage to be constant P; C3 means that the receiving beam forming weight cannot exceed 1 because there is no extra energy for signal amplification, where $1_{1 \times A}$ represents an all-1 vector of size 1×A; C4 limits the upper and lower bounds of the time division factor;

the step of solving optimal system configuration comprises:

S1. setting the maximum number of optimizations and a convergence threshold, setting initial values of W, B and τ, and calculating a common parameter;

S2. conducting optimal value search in a feasible region [$\tau^{lb}$,1) through a golden section search algorithm to obtain τ*, and updating the common parameter, optimizing W under a new common parameter to obtain W*, and updating the common parameter; optimizing B under a new common parameter to obtain B*, and updating the common parameter; obtaining a new τ* again through the golden section search algorithm under a new common parameter, and updating the common parameter;

S3. repeating S2 until a difference between two adjacent optimizations is less than the convergence threshold or reaches the maximum number of optimizations, to obtain final W*, B* and τ*.

It should be noted that:

In the practical application process, the optimization order of W, B and τ can be changed. Experiments show that the difference of the optimization orders of W, B and τ has a certain influence on the convergence speed of the algorithm. Firstly, optimization of τ has higher convergence speed in most cases.

The optimal transmission strategy is obtained on the basis of mathematical representation of wireless energy transmission and wireless data communication transmitting-receiving process, and analysis of energy harvesting performance of each sensor node and information transmitting-receiving performance of each UAV node, including:

(1) Channel Model

The channel parameters of radio frequency signals are mainly affected by propagation loss, shadow effect and multipath reflection. A path loss model adopted by the present invention is $$PL(d,f) = PL'(d,f) \cdot X$$

where PL' is spatial propagation loss; d represents a spatial distance between a transmitter and a receiver, f represents signal transmission frequency; and X is a fading factor caused by the shadow effect and multipath reflection.

2) Analysis of Information Transmission Throughput in the Swarm

Assuming that the total transmission power of the UAV swarm in the WEH stage is P and W=[$w_1, \ldots, w_N$] is the power allocation weight ($WW^H$=1) of each UAV, then the total transmission power of the UAV i is:

$$P_U^i = w_i^2 P$$

Because the transmission power of each UAV is evenly distributed on $$\frac{A}{2}$$

transmitting antennas, the transmission power of a single antenna of the UAV i can be expressed as $$\frac{2w_i^2 P}{A}$$

(i=1, . . . , N), and a transmitting signal is:

$$\hat{x}_U^i = \sqrt{\frac{2P}{A}} w_i x_U^i$$

where $x_U^i$ is a unit power signal carrying the state information of the UAV i, i.e., $E[|x_U^i|^2]=1$. A channel between the UAV i and k (k=1, . . . , N) is represented as $J_{ik} \in \mathbb{L}^{A/2 \times A/2}$, and a maximum ratio combination method is adopted for multi-antenna reception. Therefore, the receiving weight can be represented as $V_{ik} = \hat{J}_{ik}/|\hat{J}_{ik}|$, where the vector $\hat{J}_{ik} \in \mathbb{L}^{1 \times A/2}$ is obtained by summing the channel matrix $J_{ik}$ by column. The signal-to-noise ratio of a signal received by the UAV k from the UAV i is:

$$\Gamma_{ik} = \frac{2 P w_i^2 |\hat{J}_{ik} V_{ik}^H|^2}{A \sigma_U^2 |V_{ik}|^2}$$

where $\sigma_U^2$ is noise power on a single antenna of the UAV. The length of each transmission time block is represented as T, and then the length in the WEH stage is τT, where τ is a time division factor and the throughput between the UAVs i to k can be represented as:

$$r_{ik} = \tau T \log_2(1+\Gamma_{ik})$$

The minimum throughput requirement for the UAVs i to k (k≠i) is set as $Y_{ik}$, and $r_{ik} \geq Y_{ik}$ needs to be satisfied. At this moment:

$$w_i \geq \sqrt{\left(2^{\frac{Y_{ik}}{\tau T}} - 1\right) \frac{A \sigma_U^2 |V_{ik}|^2}{2P |\hat{J}_{ik} V_{ik}^H|^2}} = (w_i^{lb})^k$$

Because $w_i$ needs to be greater than all $(w_i^{lb})^k$ at the same time, it can be obtained $$w_i \geq \text{Max}[(w_i^{lb})^k] = w_i^{lb}$$

Similarly, there is a lower bound for τ

$$\tau \geq \text{Max}\left[\frac{\gamma_{ik}}{T \log_2(1+\Gamma_{ik})}\right] = \tau^{lb}$$

(3) Analysis of Energy Harvested by Sensor

The quantity of the sensors in each subnet is defined. $H_k^{ij} \in \mathbb{L}^{1 \times A/2}$ is a channel vector from the UAV k to the $k^{th}$ sensor $S_{ij}$ (j=1, . . . , M) in the subnet i; and noise power on a single antenna of the sensor is $\sigma_S^2$. An energy harvesting model can be expressed as a linear function $P_{harvest} = \eta P_{input}$, where η(0<η<1) is conversion efficiency, and in the WEH stage, the total energy harvested by $S_{ij}$ is:

$$E_S^{ij} = \eta \tau T \left(\frac{2P |WH_{ij}^H|^2}{A} + \sigma_S^2\right) \approx \frac{2\eta \tau T P |WH_{ij}^H|^2}{A}$$

where $H_{ij}=[(H_1{}^{ij})^H, (H_2{}^{ij})^H, \ldots, (H_N{}^{ij})^H]$ represents a channel matrix from the UAV swarm to the sensor $S_{ij}$.

(4) Analysis of Sensor Uplink Throughput

In the WIT stage, the transmission time of each sensor is $$\frac{(1-\tau)T}{M},$$

and then the transmission power of the sensor $S_{ij}$ can be expressed as:

$$P_S^{ij} = \frac{E_S^{ij}}{(1-\tau)T/M} = \frac{2M\eta\tau P|WH_{ij}^H|^2}{(1-\tau)A}$$

Because the UAV does not transmit signals in the WIT stage, A antennas can be used for data reception. $G_{kj}^i \in \mathbb{C}^{A\times 1}$ is a channel vector from the sensor $S_{kj}$ to the UAV i, $x_S^{kj}$ is a unit power signal carrying the perception information of the sensor $S_{kj}$, i.e., $E[|x_S^{kj}|^2]=1$. To suppress the interference from the sensors in adjacent subnets, multi-antenna weighted reception is conducted at the UAV to improve the signal-to-noise ratio. For the UAV i, when the data of the $j^{th}$ sensor in the subnets is received, the receiving beam forming weight vector is expressed as $B_{ij} \in \mathbb{C}^{1\times A}$, and a received signal is:

$$y_U^{ij} = B_{ij}\left(\sum_{k=1}^N G_{kj}^i \sqrt{P_S^{kj}} x_S^{kj} + n_U\right)$$

where $n_U=[n_U^1, n_U^2, \ldots, n_U^A]^H$ is the antenna noise of the UAV, and $n_U^a$ CN $(0, \sigma n_U^2)$. Therefore, the signal-to-noise ratio of the received signal of the UAV i in time slot j is:

$$\gamma_{ij} = \frac{P_S^{ij}|B_{ij}G_{ij}^i|^2}{\sum_{k=1,k\neq i}^N P_S^{kj}|B_{ij}G_{kj}^i|^2 + |B_{ij}|^2\sigma_U^2}$$

The total throughput in the $i^{th}$ subnet is:

$$C_i(W, B_{ij}, \tau) = \frac{(1-\tau)T}{M}\log_2(1+\gamma_{ij}) =$$

$$\frac{(1-\tau)T}{M}\sum_{j=1}^M \log_2\left(1 + \frac{2MP\eta\tau|WH_{ij}^H|^2|B_{ij}G_{ij}^i|^2}{\sum_{k=1,k\neq i}^N 2MP\eta\tau|WH_{kj}^H|^2|B_{ij}G_{kj}^i|^2 + A(1-\tau)|B_{ij}|^2\sigma_U^2}\right).$$

Preferably, the sensors are awakened after receiving an energy signal, and broadcast an access request to the UAV swarm after obtaining sufficient energy, each UAV selects M=K/N sensors with the best channel state within a range, and broadcasts indexes of selected sensors in the swarm; for unselected sensors, the UAV with the best channel state is designated to be responsible for information receiving; then, the remaining sensors are distributed according to channel states to form perception subnets; each of the perception subnets comprises a UAV and M sensors managed by the UAV;

each UAV in the swarm shares the own state through a broadcast channel to realize joint control of swarm transmission strategies;

the sensors are operated in a half-duplex mode in $f_S$ band and the UAV is operated in a full-duplex mode in $f_U$ band.

Preferably, in the WEH stage, sensor energy harvesting and broadcast communication in the swarms are conducted; during the period, all UAVs adopt an orthogonal frequency division multiplexing (OFDM) technology, and broadcast own state information to other UAV nodes in the swarm at the same time; A antennas are equally divided into transmitting antennas and receiving antennas to realize full-duplex communication; meanwhile, the sensors use radio frequency signals radiated during communication in the UAV swarm for conducting energy harvesting for data transmission in the WIT stage; the WIT stage is distributed to the sensors for uploading perception data, and the transmission time of the WIT stage is equally divided into M time slots; and in a $j^{th}$ time slot, $j^{th}$ sensors in all the subnets simultaneously use the harvested energy to send perception information to corresponding UAVs, and realize point-to-point communication through fixed channels.

Preferably, the specific contents of conducting optimal value search in a feasible region $[\tau^{lb},1)$ through a golden section search algorithm to obtain an optimal solution $\tau^*$ of the time division factor in S2 comprise:

fixing B and W as constants, and making $\chi_{ij} = \sum_{k=1,k\neq i}^N 2MP\eta|WH_{kj}^H|^2|B_{ij}G_{kj}^i|^2$, $\psi_{ij}=2MP\eta|WH_{ij}^H|^2|B_{ij}G_{ij}^i|^2$, then $\tau^*$ is:

$$\max_\tau \sum_{i=1}^N \sum_{j=1}^M \xi_i \frac{(1-\tau)T}{M} \log_2\left(1 + \frac{\tau\psi_{ij}}{\chi_{ij}\tau + A(1-\tau)|B_{ij}|^2\sigma_U^2}\right)$$

s.t. $\tau^{lb} \leq \tau < 1.$ where $\chi_{ij}$ and $\psi_{ij}$ are intermediate variables used to simplify mathematical description; P is the total transmission power of the UAV swarm in the WEH stage; $\eta$ is conversion efficiency and $0<\eta<1$; $H_k^{ij} \in \mathbb{C}^{1\times A/2}$ is a channel vector from the UAV k to the $j^{th}$ sensor $S_{ij}$ in the perception subnet i; and $H_{ij}=[(H_1{}^{ij})^H, (H_2{}^{ij})^H, \ldots, (H_N{}^{ij})^H]$ represents a channel matrix from the UAV swarm to the sensor $S_{ij}$.

It should be noted that:

$\chi_{ij}$ and $\psi_{ij}$ are intermediate variables introduced to simplify mathematical description, and have no practical physical significance. Without simplifying the description, the expression of an optimization problem may become complex and obscure.

Preferably, the specific contents of optimizing W under a new common parameter to obtain an optimal solution W* of the power allocation weight in S2 comprise:

fixing B and $\tau$ as constants, and defining $Q_{ij}^n(B_{ij},\tau) = \sum_{k=1}^N 2MP\eta\tau|B_{ij}G_{kj}^i|^2$, $|H_{kj}|^2+A(1-\tau)\sigma_U^2|B_{ij}|^2 I_N$, and $Q_{ij}^d(B_{ij},\tau)=\sum_{k=1,k\neq i}^N 2MP\eta\tau|B_{ij}G_{kj}^i|^2|H_{kj}|^2+A(1-\tau)\sigma_U^2|B_{ij}|^2 I_N$, then W* is:

$$(P3): \max_W \frac{WQ_{ij}^n(B_{ij},\tau)W^H}{WQ_{ij}^d(B_{ij},\tau)W^H}$$

s.t. $C1: W \pm W^{lb},$ $C2: WW^H = 1.$ where $G_{kj}^i \in \mathbb{L}^{A \times 1}$ is a channel vector from the sensor $S_{kj}$ to the UAV i; $H_k^{ij} \in \mathbb{L}^{1 \times A/2}$ is a channel vector from the UAV k to the $j^{th}$ sensor $S_{ij}$ in the perception subnet i̇; $H_{ij}=[(H_1^{ij})^H, (H_2^{ij})^H, \ldots, (H_N^{ij})^H]$ represents a channel matrix from the UAV swarm to the sensor $S_{ij}$; $\sigma_U^2$ is the noise power on the single antenna of the UAV; and $I_N$ is an N-order unit matrix.

It should be further noted that:

The objective function in the above formula can be solved by solving the eigenvector of the matrix $Q_{ij}=[Q_{ij}^d(B_{ij},\tau)]^{-1} Q_{ij}^n(B_{ij},\tau)$. Firstly, the above formula is divided into M×N separate optimization problems, and $W_{ij}=[w_{ij}^1, w_{ij}^2, \ldots, w_{ij}^N]$ is used to represent a copy of W in the separate optimization problems. To transform into a standard Rayleigh quotient, a new variable $K_{ij}=W_{ij}[Q_{ij}^d(B_{ij},\tau)]^{1/2}$ is introduced, and then $W_{ij}=K_{ij}[Q_{ij}^d(B_{ij},\tau)]^{-1/2}$ exists.

The solving process of (P3) is:

Firstly, (P3) is divided into M×N separate optimization problems, and the eigenvector of the matrix $Q_{ij}=[Q_{ij}^d(B_{ij},\tau)]^{-1}Q_{ij}^n(B_{ij},\tau)$ is solved to solve $W_{ij}^*$.

Secondly, a new variable $K_{ij}=W_{ij}[Q_{ij}^d(B_{ij},\tau)]^{1/2}$ is introduced to transform an optimization objective into a standard Rayleigh quotient form, and a transformational relation $W_{ij}=K_{ij}[Q_{ij}^d(B_{ij},\tau)]^{-1/2}$ is obtained.

Next, in order to satisfy C1, $w_{ij}^k$ which does not reach the lower bound is forcibly set as the lower bound $(w_{ij}^k)^{lb}$, and the corrected allocation weight vector is defined as $\hat{W}_{ij}$, and $\hat{K}_{ij}=\hat{W}_{ij}[Q_{ij}^d(B_{ij},\tau)]^{1/2}$.

Moreover, the matrix $Q_{ij}$ is corrected and recorded as $\hat{Q}_{ij}$ so that the matrix still satisfies the eigenvalue definition $\hat{K}_{ij}\hat{Q}_{ij}=\beta\hat{K}_{ij}$, where $\beta_{ij}$ is a maximum eigenvalue of $Q_{ij}$.

Then, Eigmaxv$(\hat{Q}_{ij})$ is recalculated; and the element forcibly set as the lower bound is fixed, normalized and recorded as $K_{ij}^*$ to obtain $W_{ij}^*=K_{ij}^*[Q_{ij}^d(B_{ij},\tau)]^{-1/2}$.

Finally, based on weighted approximation, $W_{ij}^*$ is transformed into $W^*$, and the weighting coefficient is set as $\rho_{ij'}=\xi_i\alpha_{ij}$.

Preferably, the specific contents of optimizing B under a new common parameter to obtain an optimal solution $B^*$ of the receiving beam forming weight in S2 comprise:

fixing W and $\tau$ as constants, defining $D_U^{n*}(W,\tau)=\sum_{k=1}^N 2MP\eta\tau|WH_{kj}^H|^2|G_{kj}^i|^2+A(1-\tau)\sigma_U^2 I_A$ and $D_{ij}^d(W,\tau)=\sum_{k=1,k\neq i}^N 2MP\eta\tau|WH_{kj}^H|^2|G_{kj}^i|^2+A(1-\tau)\sigma_U^2 I_A$, and then solving a maximum value of throughput C(B) to optimize receiving beam forming:

$$C(B) = \frac{(1-\tau)T}{M}\sum_{i=1}^{N}\sum_{j=1}^{M}\xi_i\log_2\left(\frac{B_{ij}D_{ij}^n(W,\tau)B_{ij}^H}{B_{ij}D_{ij}^d(W,\tau)B_{ij}^H}\right)$$

where every logarithmic term is a generalized Rayleigh quotient; for the UAV i, when the data from the $j^{th}$ sensor in the subnets is received, the receiving beam forming weight vector is expressed as $B_{ij} \in \mathbb{L}^{1 \times A}$; $D_{ij}^n$ and $D_{ij}^d$ are intermediate variables used to simplify the mathematical description.

It should be noted that $B_{ij}$ is independent. Therefore, in order to obtain the maximum value of C(B), the optimal solution of the vector $B_{ij}$ is only required to be found. Considering the monotonicity of logarithmic functions, the maximum value of C(B) is solved by solving the optimal solution of the vector $B_{ij}$ respectively, namely:

$$(P2): \max_{B_{ij}} \frac{B_{ij}D_{ij}^n(W,\tau)B_{ij}^H}{B_{ij}D_{ij}^d(W,\tau)B_{ij}^H}$$

s.t. $C1: B_{ij}° 1_{1 \times A}$.

According to a Rayleigh quotient theory, the optimal solution of $B_{ij}$ is obtained by solving an eigenvector corresponding to a maximum eigenvalue of the matrix $D_{ij}=[D_{ij}^d(W,\tau)]^{-1}D_{ij}^n(W,\tau)$, and the calculation of solving the optimal solution of $B_{ij}$ is defined as Eigmaxv(•), then $$B_{ij}^* = \text{Eigmaxv}(D_{ij})$$

$B_{ij}^*$ is calculated separately to obtain each column in the matrix $B^*$, to obtain $B^*$.

It should be further noted that:

There are two main differences between (P3) and (P2).

The first difference is that in (P2), due to the existence of the lower bound, the obtained eigenvector needs to be corrected: firstly, in order to satisfy C1, $w_{ij}^k$ which does not reach the lower bound needs to be forcibly set as the lower bound $(w_{ij}^k)^{lb}$, and the corrected allocation weight vector is defined as $\hat{W}_{ij}$ and $\hat{K}_{ij}=\hat{W}_{ij}[Q_{ij}^d(B_{ij},\tau)]^{1/2}$. Then, on this basis, the matrix $Q_{ij}$ is corrected and recorded as $\hat{Q}_{ij}$ so that the matrix still satisfies the eigenvalue definition $\hat{K}_{ij}\hat{Q}_{ij}=\beta\hat{K}_{ij}$, where $\beta_{ij}$ is a maximum eigenvalue of $Q_{ij}$. Finally, Eigmaxv$(\hat{Q}_{ij})$ is recalculated; and the element forcibly set as the lower bound is fixed, normalized and recorded as $K_{ij}^*$ to obtain $W_{ij}^*=K_{ij}^*[Q_{ij}^d(B_{ij},\tau)]^{-1/2}$.

The second difference is that, because W is shared by M×N individual optimization problems, $W_{ij}^*$ also needs to be converted to $W^*$. A weighted approximation method is adopted in the present invention. A weighting coefficient is set as $\rho_{ij}=\xi_i\alpha_{ij}$, where $\xi_i$ is the importance factor of each subnet, and $\alpha_{ij}$ is the maximum throughput of the sensor $S_{ij}$ under $W_{ij}^*$. The method can obtain a suboptimal $W^*$, but can ensure the monitoring effect of key subnets and the normal operation of the sensors far away from the UAV.

According to the above detailed discussion, the receiving beam forming optimization can be solved by the Rayleigh quotient theory; the power allocation weight can be solved by Rayleigh quotient and weighted approximation; and the time division factor can be determined based on the golden section search algorithm. Based on the above conclusion, each optimization variable can be optimized and updated alternately. The main idea is: firstly, the remaining optimization variables are regarded as fixed values; the optimal value of a variable is solved and the common parameter is updated; then the remaining variables are optimized in sequence according to the method; at this moment, an alternate optimization is completed; and the above process is repeated until the preset optimization frequency or algorithm convergence is reached, to obtain the final parameters of the solved joint optimization.

It can be seen from the above technical solutions that, compared with the prior art, the present invention discloses and provides a wireless perception system energy and information transmission method for a UAV swarm. With respect to the defects of small coverage range and serious double near-far effects of a wireless power supply network, the present invention proposes to expand the coverage range of a data acquisition system through network division and multi-UAV collaboration, so as to suppress the double near-far effects. The present invention fully considers extra energy and interference in a multi-network environment, and the constructed system model is more accurate. In addition, the traditional infinite energy transmission solution cannot make full use of the energy of radio frequency signals. However, the present invention recovers the signals radiated during information interaction in the UAV swarm to charge the sensors, to maximize the network energy efficiency. The technology of the present invention can be widely used in various fields of regular bridge detection, farmland monitoring and the like, and has strong practical application value.

DESCRIPTION OF DRAWINGS

To more clearly describe the technical solution in the embodiments of the present invention or in the prior art, the drawings required to be used in the description of the embodiments or the prior art will be simply presented below. Apparently, the drawings in the following description are merely the embodiments of the present invention, and for those ordinary skilled in the art, other drawings can also be obtained according to the provided drawings without contributing creative labor.

DETAILED DESCRIPTION

The technical solution in the embodiments of the present invention will be clearly and fully described below in combination with the drawings in the embodiments of the present invention. Apparently, the described embodiments are merely part of the embodiments of the present invention, not all of the embodiments. Based on the embodiments in the present invention, all other embodiments obtained by those ordinary skilled in the art without contributing creative labor will belong to the protection scope of the present invention.

Figure 1:
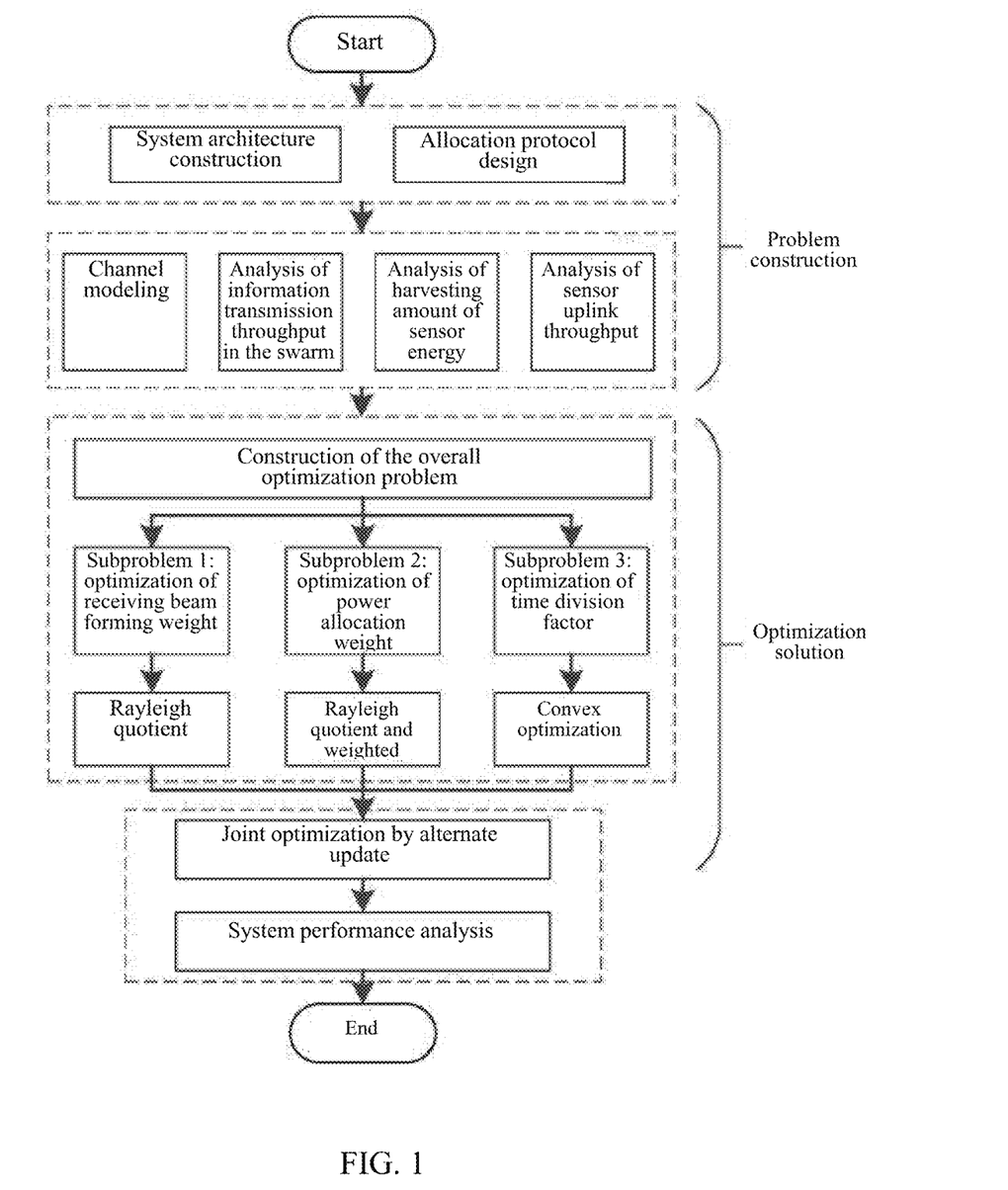
FIG. 1 is a flow chart of a wireless perception system energy and information transmission method of a UAV swarm provided by embodiments of the present invention.

Embodiments of the present invention disclose a wireless perception system energy and information transmission method of a UAV swarm, as shown in FIG. 1, which comprises the following specific contents:

(1) Networking Process

Figure 2:
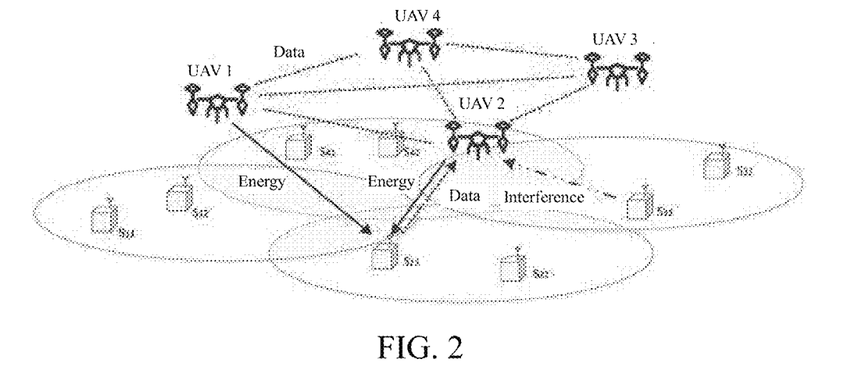
FIG. 2 is a schematic diagram of a multi-UAV autonomous collaborative data acquisition system model in a wireless perception system energy and information transmission method of a UAV swarm provided by embodiments of the present invention.

K wireless powered sensors are pre-arranged at perception positions. When perception is required, the UAV swarm arrives at a designated region to conduct wireless energy transmission for the sensors. The sensors are awakened after receiving an energy signal, and broadcast an access request to the UAV swarm after obtaining sufficient energy. Each UAV selects M=K/N sensors with the best channel state within a range, and broadcasts indexes of selected sensors in the swarm; for unselected sensors, the UAV with the best channel state is forced to be responsible for receiving the information; then, the remaining sensors are distributed according to channel states; and a perception subnet is formed by each UAV and M sensors managed by the UAV.

Figure 3:
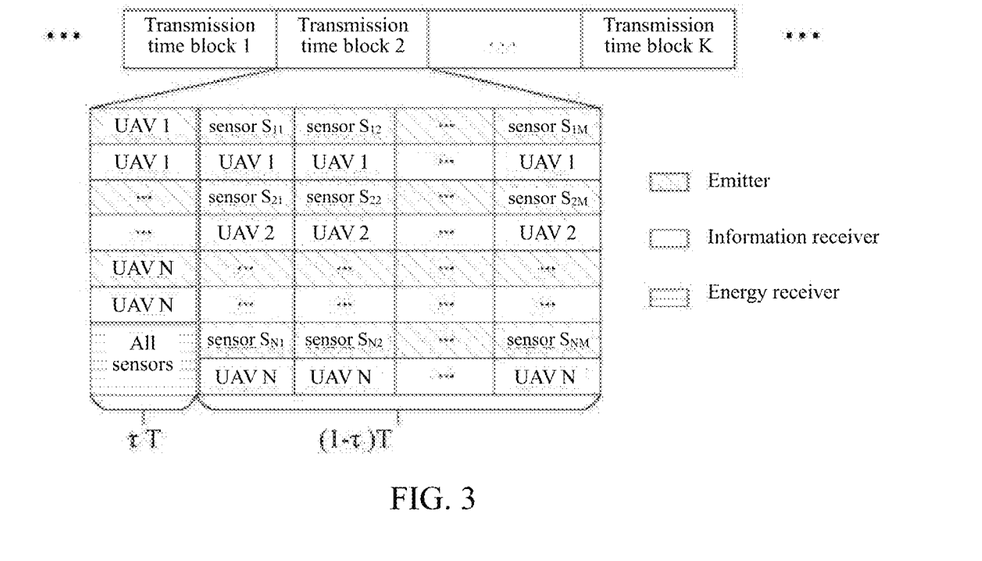
FIG. 3 is a schematic diagram of a transmission protocol in a wireless perception system energy and information transmission method of a UAV swarm provided by embodiments of the present invention.

(2) Time Slot Allocation

In the WEH stage, all UAVs use OFDM technology to simultaneously broadcast state information to other nodes in the swarm; and A/2 antennas are selected as transmitting antennas, and other A/2 antennas are selected as receiving antennas to achieve full-duplex communication. The sensors acquire energy from radio frequency signals radiated from the UAV swarm, and the energy is stored in supercapacitors or batteries. In the WIT phase, the sensors in the subnet are communicated with the connected UAVs in sequence in the allocated time slots; all subnets conduct the above process at the same time; and the UAVs only conduct point-to-point communication with a single sensor in the subnets in each time slot.

(1) Channel Model Setting

By referring to a path loss model based on propagation loss, shadow effect and multipath reflection, signal loss in a channel propagation process can be expressed as:

$$Ch = 10^{\frac{PL(d,f)}{20}}$$

In an open scenario, the space between the UAVs and the sensors can be approximated as a free space.

2) Analysis of Information Transmission Throughput in the Swarm

The total transmission power of the UAV swarm is P. According to the comprehensive settings of data amount of perception tasks, UAV battery capacity and overall acquisition time, through power allocation, it can be known that the transmission power of UAV i is:

$$P_U^i = w_i^2 P$$

The UAV modulates the state information $x_U^i$ on an orthogonal carrier in $f_U$ band and evenly distributes the transmission power on the transmitting antenna, and a transmitting signal is $$\hat{x}_U^i = \sqrt{\frac{2P}{A}} w_i x_U^i$$

At the same time, in order to improve a signal-to-noise ratio, a maximum ratio combining technology is used on the remaining antennas to conduct multi-antenna diversity reception. The weight is determined by the received signal strength on each antenna. Because the transmitting signal of each antenna is identical, the weight $V_{ik}$ can be obtained directly through the channel state, and the signal-to-noise ratio of the signal received by the UAV k from the UAV i is solved as $$\Gamma_{ik} = \frac{2Pw_i^2 |\hat{J}_{ik} V_{ik}^H|^2}{A\sigma_U^2 |V_{ik}|^2}$$

According to Shannon's theorem, the throughput between the UAVs i and k is obtained:

$$r_{ik} = \tau T \log_2(1+\Gamma_{ik})$$

(3) Analysis of Harvesting Amount of Sensor Energy

In a network with low power consumption, the energy harvesting model can be expressed as a linear function $P_{harvest} = \eta P_{input}$. Because noise power is small, noise power is not considered in energy harvesting, and the total energy harvested by the sensor $S_{ij}$ in the WEH stage is calculated:

$$E_S^{ij} = \eta \tau T \left( \frac{2P|WH_{ij}^H|^2}{A} + \sigma_S^2 \right) \approx \frac{2\eta \tau TP|WH_{ij}^H|^2}{A}$$

(4) Analysis of Sensor Uplink Throughput

In the WIT stage, each sensor consumes all energy for data transmission, and the transmission power is solved as $$P_S^{ij} = \frac{E_S^{ij}}{(1-\tau)T/M} = \frac{2M\eta\tau P|WH_{ij}^H|^2}{(1-\tau)A}$$

In time slot j, the $J^{th}$ sensors in all the subnets simultaneously modulate the signal $x_S^{kj}$ carrying perception information at frequency $f_S$. It should be noted that in the access stage, if the channel states of two sensors are similar at the UAV i, the two sensors are considered to be at similar distances from the UAV i. If more than two UAVs report that the two sensors are at similar distances, the two sensors are considered to be close in space. If the two sensors are connected to different UAVs, the two sensors are allocated to different time slots to avoid interference. The receiving beam forming is achieved by multi-antenna diversity weighting, and the signal-to-noise ratio of the received signal of the UAV i in time slot j is:

$$\gamma_{ij} = \frac{P_S^{ij}|B_{ij}G_{ij}^i|^2}{\sum_{k=1,k\neq i}^{N} P_S^{kj}|B_{ij}G_{kj}^i|^2 + |B_{ij}|^2\sigma_U^2}$$

According to Shannon's theorem, the total thro put of all the subnets is $$C(W, B, \tau) = \sum_{i=1}^{N}\sum_{j=1}^{M} \frac{(1-\tau)T}{M}\log_2(1+\gamma_{ij})$$

(1) Construction of the Overall Optimization Problem

Knowing the total throughput expression and constraints, for the power allocation weight W of optimization variables, the receiving beam forming matrix B and the time division factor $\tau$, the overall optimization problem can be directly constructed as follows:

$$\max_{W,B,\tau}\sum_{i=1}^{N}\xi_i C_i(W, B_{ij}, \tau)$$

s.t. $C1: W \pm W^{lb}$,
$C2: WW^H = 1$,
$C3: B_{ij} \circ 1_{1\times A}$,
$C4: \tau^{lb} \leq \tau < 1$.

(2) Optimization of Receiving Beam Forming Weight

Firstly, W and $\tau$ are set as constants. In order to increase the convergence speed, W is set as an equal-weight allocation vector, and $\tau$ is set as a median value $(\tau^{lb}+1)/2$ of a feasible interval. Then, the matrices $D_{ij}^n(W,\tau) = \sum_{k=1}^{N} 2MP\eta\tau|WH_{kj}^H|^2|G_{ij}^i|^2 + A(1-\tau)\sigma_U^2 I_A$ and $D_{ij}^d(W,\tau) = \sum_{k=1,k\neq i}^{N} 2MP\eta\tau|WH_{kj}^H|^2|G_{kj}^i|^2 + A(1-\tau)\sigma_U^2 I_A$ are calculated, and a separate optimization problem of $B_{ij}$ is constructed:

$$\max_{B_{ij}} \frac{B_{ij}D_{ij}^n(W,\tau)B_{ij}^H}{B_{ij}D_{ij}^d(W,\tau)B_{ij}^H}$$

s.t. $C1: B_{ij} \circ 1_{1\times A}$.

Then, the eigenvector corresponding to the largest eigenvalue of the matrix $D_{ij} = [D_{ij}^d(W,\tau)]^{-1}D_{ij}^n(W,\tau)$ is solved. In order to satisfy the constraints, the eigenvector needs to be normalized.

(3) Optimization of Power Allocation Weight

Similarly, to optimize W, we firstly fix B and $\tau$ as constants, where all $B_{ij}$ are set as equal-weight receiving vectors, and $\tau$ is set as $(\tau^{lb}+1)/2$. On this basis, $Q_{ij}^n(B_{ij},\tau) = \sum_{k=1}^{N} 2MP\eta\tau|B_{ij}G_{kj}^i|^2|H_{kj}|^2 + A(1-\tau)|B_{ij}|^2\sigma_U^2 I_N$ and $Q_{ij}^d(B_{ij},\tau) = \sum_{k=1,k\neq i}^{N} 2MP\eta\tau|B_{ij}G_{kj}^i|^2|H_{kj}|^2 + A(1-\tau)|B_{ij}|^2\sigma_U^2 I_N$ are calculated, and the optimization problem of the power allocation weight is simplified as $$\max_{W} \frac{WQ_{ij}^n(B_{ij},\tau)W^H}{WQ_{ij}^d(B_{ij},\tau)W^H}$$

s.t. $C1: W \pm W^{lb}$,
$C2: WW^H = 1$.

The solving process is:

Firstly, (P3) is divided into M×N separate optimization problems, and the eigenvector of the matrix $Q_{ij} = [Q_{ij}^d(B_{ij},\tau)]^{-1}Q_{ij}^n(B_{ij},\tau)$ is solved to solve $W_{ij}^*$.

Secondly, a new variable $K_{ij} = W_{ij}[Q_{ij}^d(B_{ij},\tau)]^{1/2}$ is introduced to transform an optimization objective into a standard Rayleigh quotient form, and a transformational relation $W_{ij} = K_{ij}[Q_{ij}^d(B_{ij},\tau)]^{-1/2}$ is obtained.

Next, in order to satisfy C1, $w_{ij}^k$ which does not reach the lower bound is forcibly set as the lower bound $(w_{ij}^k)^{lb}$, and the corrected allocation weight vector is defined as $\hat{W}_{ij}$, and $\hat{K}_{ij} = \hat{W}_{ij}[Q_{ij}^d(B_{ij},\tau)]^{1/2}$.

Moreover, the matrix $Q_{ij}$ is corrected and recorded as $\hat{Q}_{ij}$ so that the matrix still satisfies the eigenvalue definition $\hat{K}_{ij}\hat{Q}_{ij} = \beta\hat{K}_{ij}$, where $\beta_{ij}$ is a maximum eigenvalue of $Q_{ij}$.

Then, Eigmaxv($\hat{Q}_{ij}$) is recalculated; and the element forcibly set as the lower bound is fixed, normalized and recorded as $K_{ij}^*$, to obtain $W_{ij}^* = K_{ij}^*[Q_{ij}^d(B_{ij},\tau)]^{-1/2}$.

Finally, based on the weighting of the importance factor, $W_{ij}^*$ is transformed into $W^*$, and the weighting coefficient is set as $\rho_{ij} = \xi_i\alpha_{ij}$.

(4) Optimization of Time Division Factor

W is set as the equal-weight power allocation vector; $B_{ij}$ is set as the equal-weight receiving vector; the constant parameters $\chi_{ij} = \sum_{k=1,k\neq i}^{N} 2MP\eta|WH_{kj}^H|^2|B_{ij}G_{kj}^i|^2$ and $\psi_{ij} = 2MP\eta|WH_{ij}^H|^2|B_{ij}G_{ij}^i|^2$ are calculated respectively; and the optimization problem of the time division factor is simplified as $$\max_{\tau}\sum_{i=1}^{N}\sum_{j=1}^{M}\xi_i\frac{(1-\tau)T}{M}\log_2\left(1+\frac{\tau\psi_{ij}}{\chi_{ij}\tau + A(1-\tau)|B_{ij}|^2\sigma_U^2}\right)$$

s.t. $\tau^{lb} \leq \tau < 1$.

Then, the lower bound $\tau^{lb}$ of $\tau$ is calculated; the feasible region of solving is set as $[\tau^{lb},1)$; and the golden section search method is used for solving.

Joint optimization can be achieved by an alternating update algorithm: it is known that the receiving beam forming optimization can be solved by the Rayleigh quotient theory; the power allocation weight can be solved by Rayleigh quotient and weighted approximation; and the time division factor can be determined based on the golden section search algorithm. According to the description in step 3, firstly, the remaining optimization variables are regarded as fixed values; the optimal value of a variable is solved and the common parameter is updated; then the remaining variables are optimized in sequence according to the method; at this moment, an alternate optimization is completed; and the above process is repeated until the preset optimization frequency or algorithm convergence is reached, to obtain the final parameters of the solved joint optimization.

Each embodiment in the description is described in a progressive way. The difference of each embodiment from each other is the focus of explanation. The same and similar parts among all of the embodiments can be referred to each other. For a device disclosed by the embodiments, because the device corresponds to a method disclosed by the embodiments, the device is simply described. Refer to the description of the method part for the related part.

The above description of the disclosed embodiments enables those skilled in the art to realize or use the present invention. Many modifications to these embodiments will be apparent to those skilled in the art. The general principle defined herein can be realized in other embodiments without departing from the spirit or scope of the present invention. Therefore, the present invention will not be limited to these embodiments shown herein, but will conform to the widest scope consistent with the principle and novel features disclosed herein.

What is claimed is:

1. A wireless perception system energy and information transmission method of an unmanned aerial vehicle (UAV) swarm, comprising the following steps:

building a wireless perception system architecture based on autonomous and collaborative energy supply of a UAV swarm, wherein the wireless perception system architecture comprises K wireless powered sensors pre-arranged at perception positions and a freely movable UAV swarm, the UAV swarm comprises N UAVs, and each perception subnet comprises a UAV and M sensors managed by the UAV; in the wireless perception system architecture, the UAVs are all provided with A antennas, and the sensors are only provided with a single antenna due to limitations of size and cost;

in the wireless perception system architecture, when perception is required, the UAV swarm arrives at a designated region to perform wireless energy transmission and wireless information transmission on the sensors; each transmission process comprises two stages: the wireless energy harvesting (WEH) stage and the wireless information transmission (WIT) stage;

based on the wireless perception system architecture, establishing a joint optimization model by combining a power allocation weight W, a receiving beam forming weight B and a time division factor $\tau$ in the UAV swarm, and solving optimal system configuration to obtain an optimal transmission strategy; maximizing the total throughput of a sensor uplink under the constraints of data throughput in the UAV swarm;

the joint optimization model is:

$$\max_{W,B,\tau} \sum_{i=1}^{N} \xi_i C_i(W, B_{ij}, \tau)$$

s.t. $C1: W \pm W^{lb}$, $C2: WW^H = 1$, $C3: B_{ij}{}^\circ 1_{1 \times A}$, $C4: \tau^{lb} \leq \tau < 1$.

where $\xi_i$ is an importance factor and $\xi_i > 0$; $C_i(W, B_{ij}, \tau)$ is the total throughput in the $i^{th}$ subnet; $B_{ij}$ is a receiving beam forming weight vector; $w_i{}^{lb}$ is a lower bound of an $i^{th}$ element of a power allocation weight vector W, $W^H$ represents the conjugate transpose of the vector TV; and $\tau^{lb}$ is a lower bound of the time division factor $\tau$;

C1, C2 and C3 are constraints; C1 is a data throughput constraint in the UAV swarm; $W^{lb} \in \lfloor^{1 \times N}$ is a vector with $w_i{}^{lb}$ as an element, and represents the lower bound of W; C2 constrains the total power of the wireless energy harvesting (WEH) stage to be constant P; C3 means that the receiving beam forming weight cannot exceed 1 because there is no extra energy for signal amplification, where $1_{1 \times A}$ represents an all-1 vector of size 1×A; C4 limits the upper and lower bounds of the time division factor;

the step of solving optimal system configuration comprises:

S1. setting the maximum number of optimizations and a convergence threshold, setting initial values of TV, B and $\tau$, and calculating a common parameter;

S2. conducting optimal value search in a feasible region $[\tau^{lb}, 1)$ through a golden section search algorithm to obtain an optimal solution $\tau^*$ of the time division factor, and updating the common parameter; optimizing W under a new common parameter to obtain an optimal solution W* of the power allocation weight, and updating the common parameter; optimizing B under a new common parameter to obtain an optimal solution B* of the beam forming weight, and updating the common parameter; obtaining a new $\tau^*$ again through the golden section search algorithm under a new common parameter, and updating the common parameter;

S3. repeating S2 until a difference between two adjacent optimizations is less than the convergence threshold or reaches the maximum number of optimizations, to obtain final W*, B* and $\tau^*$.

2. The wireless perception system energy and information transmission, method of the UAV swarm according to claim 1, wherein the sensors are awakened after receiving an energy signal, and broadcast an access request to the UAV swarm after obtaining sufficient energy; each UAV selects M=K/N sensors with a best channel state within a range, and broadcasts indexes of selected sensors in the swarm; for unselected sensors, the UAV with the best channel state is designated to be responsible for information receiving; then, the remaining sensors are distributed according to channel states to form perception subnets; each of the perception subnets comprises a UAV and M sensors managed by the UAV;

each UAV in the swarm shares the own state through a broadcast channel to realize joint control of swarm transmission strategies;

the sensors are operated in a half-duplex mode in $f_S$ band and the UAV is operated in a full-duplex mode in $f_U$ band.

3. The wireless perception system energy and information transmission method of the UAV swarm according to claim 1, wherein in the WEH stage, sensor energy harvesting and broadcast communication in the swarm are conducted; during the period, all UAVs adopt an orthogonal frequency division multiplexing (OFDM) technology, and broadcast own state information to other UAV nodes in the swarm at the same time; A antennas are equally divided into transmitting antennas and receiving antennas to realize full-duplex communication; meanwhile, the sensors use radio frequency signals radiated during communication in the UAV swarm for conducting energy harvesting for data transmission in the WIT stage; the WIT stage is distributed to the sensors for uploading perception data, and the transmission time of the WIT stage is equally divided into M time slots; and in the $j^{th}$ time slot, the $j^{th}$ sensors in all the subnets simultaneously use the harvested energy to send perception information to corresponding UAVs, and realize point-to-point communication through fixed channels.

4. The wireless perception system energy and information transmission method of the UAV swarm according to claim 1, wherein the specific contents of conducting optimal value search in a feasible region $[\tau^{lb},1)$ through a golden section search algorithm to obtain an optimal solution $\tau^*$ of the time division factor in S2 comprise:

fixing B and W as constants, and making $\chi_{ij} = \Sigma_{k=1,k\neq i}^{N} 2MP\eta |WH_{kj}^{H}|^2 |B_{ij}G_{kj}^{i}|^2$ and $\psi_{ij} = 2MP\eta |WH_{ij}^{H}|^2 |B_{ij}G_{ij}^{i}|^2$, then $\tau^*$ is:

$$\max_{\tau} \sum_{i=1}^{N}\sum_{j=1}^{M} \xi_i \frac{(1-\tau)T}{M}\log_2\left(1 + \frac{\tau\psi_{ij}}{\chi_{ij}\tau + A(1-\tau)|B_{ij}|^2\sigma_U^2}\right)$$

s.t. $\tau^{lb} \leq \tau < 1$.

where and $\chi_{ij}$ $\psi_{ij}$ are intermediate variables used to simplify mathematical description; P is the total transmission power of the UAV swarm in the WEH stage; $\eta$ is conversion efficiency and $0<\eta<1$; $H_k^{ij}\in \mathsf{L}^{1\times A/2}$ is a channel vector from the UAV k to the $j^{th}$ sensor $S_{ij}$ in the perception subnet i; and $H_{ij}=[(H_1^{ij})^H, (H_2^{ij})^H, \ldots, (H_N^{ij})^H]$ represents a channel matrix from the UAV swarm to the sensor $S_{ij}$.

5. The wireless perception system energy and information transmission, method of the UAV swarm according to claim 1, wherein the specific contents of optimizing W under a new common parameter to obtain an optimal solution W* of the power allocation weight in S2 comprise:

fixing B and $\tau$ as constants, and defining $Q_{ij}^{n}(B_{ij},\tau) = \Sigma_{k=1}^{N} 2MP\eta\tau |B_{ij}G_{kj}^{i}|^2, |H_{kj}|^2 + A(1-\tau)\sigma_U^2|B_{ij}|^2 I_N$ and $Q_{ij}^{d}(B_{ij},\tau) = \Sigma_{k=1,k\neq i}^{N} 2MP\eta\tau |B_{ij}G_{kj}^{i}|^2 |H_{kj}|^2 + A(1-\tau)\sigma_U^2|B_{ij}|^2 I_N$;

then W* is:

$$\max_{W} \frac{WQ_{ij}^{n}(B_{ij},\tau)W^H}{WQ_{ij}^{d}(B_{ij},\tau)W^H}$$

s.t. C1: $W \pm W^{lb}$,
C2: $WW^H = 1$.

where $G_{kj}^{i}\in \mathsf{L}^{A\times 1}$ is a channel vector from the sensor $S_{kj}$ to the UAV i; $H_k^{ij}\in \mathsf{L}^{1\times A/2}$ is a channel vector from the UAV k to the sensor in the perception subnet i; $H_{ij}=[(H_1^{ij})^H, (H_2^{ij})^H, \ldots, (H_N^{ij})^H]$ represents a channel matrix from the UAV swarm to the sensor $S_{ij}$; $\sigma_U^2$ is the noise power on the single antenna of the UAV; and $I_N$ is an N-order unit matrix.

6. The wireless perception system energy and information transmission method of the UAV swarm according to claim 1, wherein the specific contents of optimizing B under a new common parameter to obtain an optimal solution B* of the receiving beam forming weight in S2 comprise:

fixing W and $\tau$ as constants, defining $D_{ij}^{n}(W,\tau) = \Sigma_{k=1}^{N} 2MP\eta\tau |WH_{kj}^{H}|^2 |G_{ij}^{i}|^2 + A(1-\tau)\sigma_U^2 I_A$ and $D_{ij}^{d}(W,\tau) = \Sigma_{k=1,k\neq i}^{N} 2MP\eta\tau |WH_{kj}^{H}|^2 |G_{kj}^{i}|^2 + A(1-\tau)\sigma_U^2 I_A$ and then solving a maximum value of throughput C(B) to optimize receiving beam, forming:

$$C(B) = \frac{(1-\tau)T}{M}\sum_{i=1}^{N}\sum_{j=1}^{M} \xi_i \log_2\left(\frac{B_{ij}D_{ij}^{n}(W,\tau)B_{ij}^{H}}{B_{ij}D_{ij}^{d}(W,\tau)B_{ij}^{H}}\right)$$

where every logarithmic term is a generalized Rayleigh quotient; for the UAV i, when the data of the $j^{th}$ sensor in the subnets is received, the receiving beam forming weight vector is expressed as $B_{ij}\in \mathsf{L}^{1\times A}$; $D_{ij}^{n}$ and $D_{ij}^{d}$ are intermediate variables used to simplify the mathematical description; the maximum value of C(B) is solved by solving the optimal solution of the vector $B_{ij}$ respectively, namely:

$$\max_{B_{ij}} \frac{B_{ij}D_{ij}^{n}(W,\tau)B_{ij}^{H}}{B_{ij}D_{ij}^{d}(W,\tau)B_{ij}^{H}}$$

s.t. C1: $B_{ij}°1_{1\times A}$.

according to a Rayleigh quotient theory, the optimal solution of $B_{ij}$ is obtained by solving an eigenvector corresponding to the maximum eigenvalue of the matrix $D_{ij}=[D_{ij}^{d}(W,\tau)]^{-1}D_{ij}^{n}(W,\tau)$, and the calculation of solving the optimal solution of $B_{ij}$ is defined as Eigmaxv(•) then
$B_{ij}^{*}$=Eigmaxv($D_{ij}$)
$B_{ij}^{*}$ is calculated separately to obtain each column in the matrix B*, to obtain B*.

* * * * *